Figure 1:
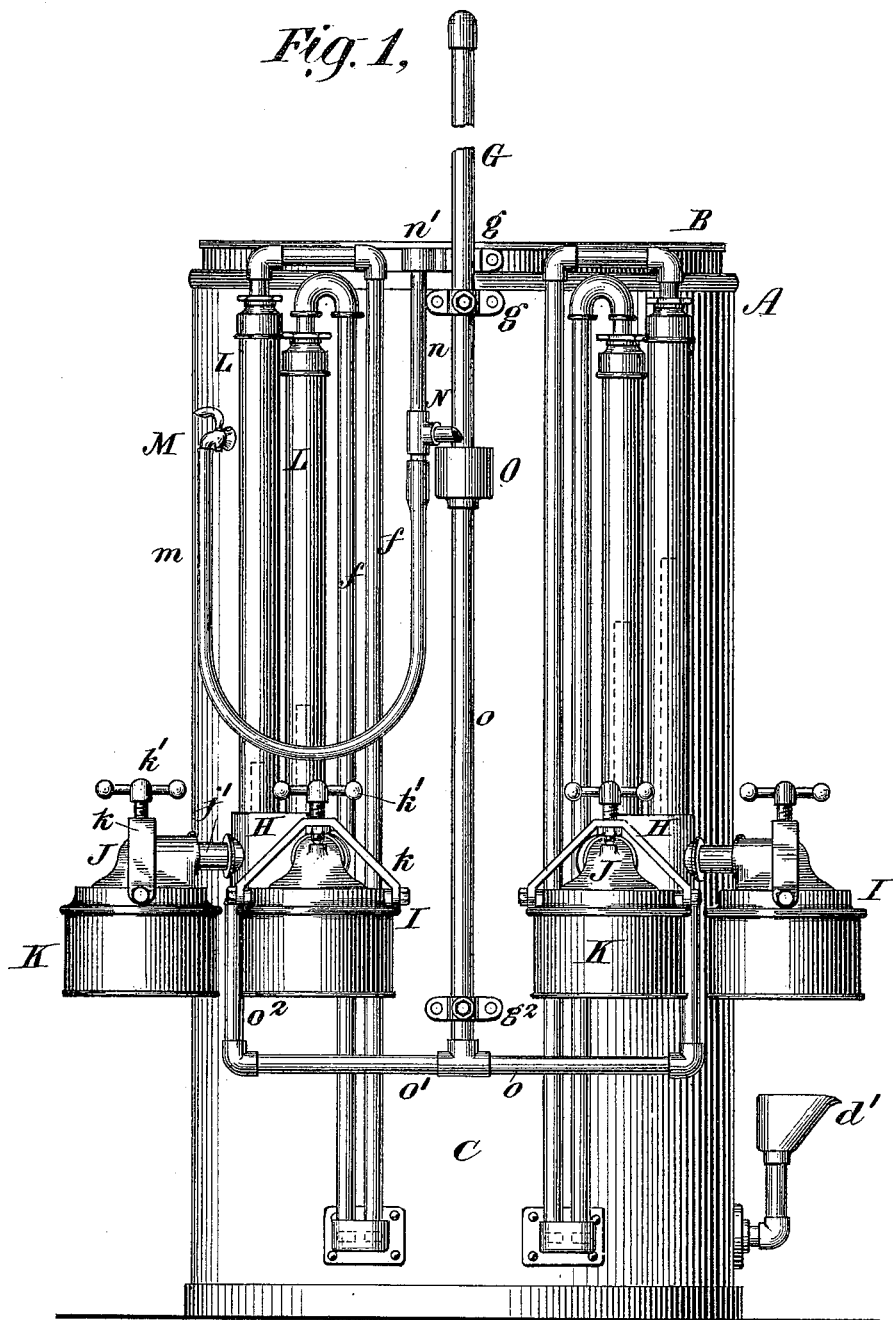

No. 643,643. Patented Feb. 20, 1900.
H. F. FULLER.
APPARATUS FOR GENERATING ACETYLENE GAS.
(Application filed Jan. 4, 1899.)
(No Model.) 3 Sheets—Sheet 1.

WITNESSES: D. N. Mayhew. Geo. E. Cruse.

INVENTOR
Henry F. Fuller
BY E. N. Dickerson
HIS ATTORNEY

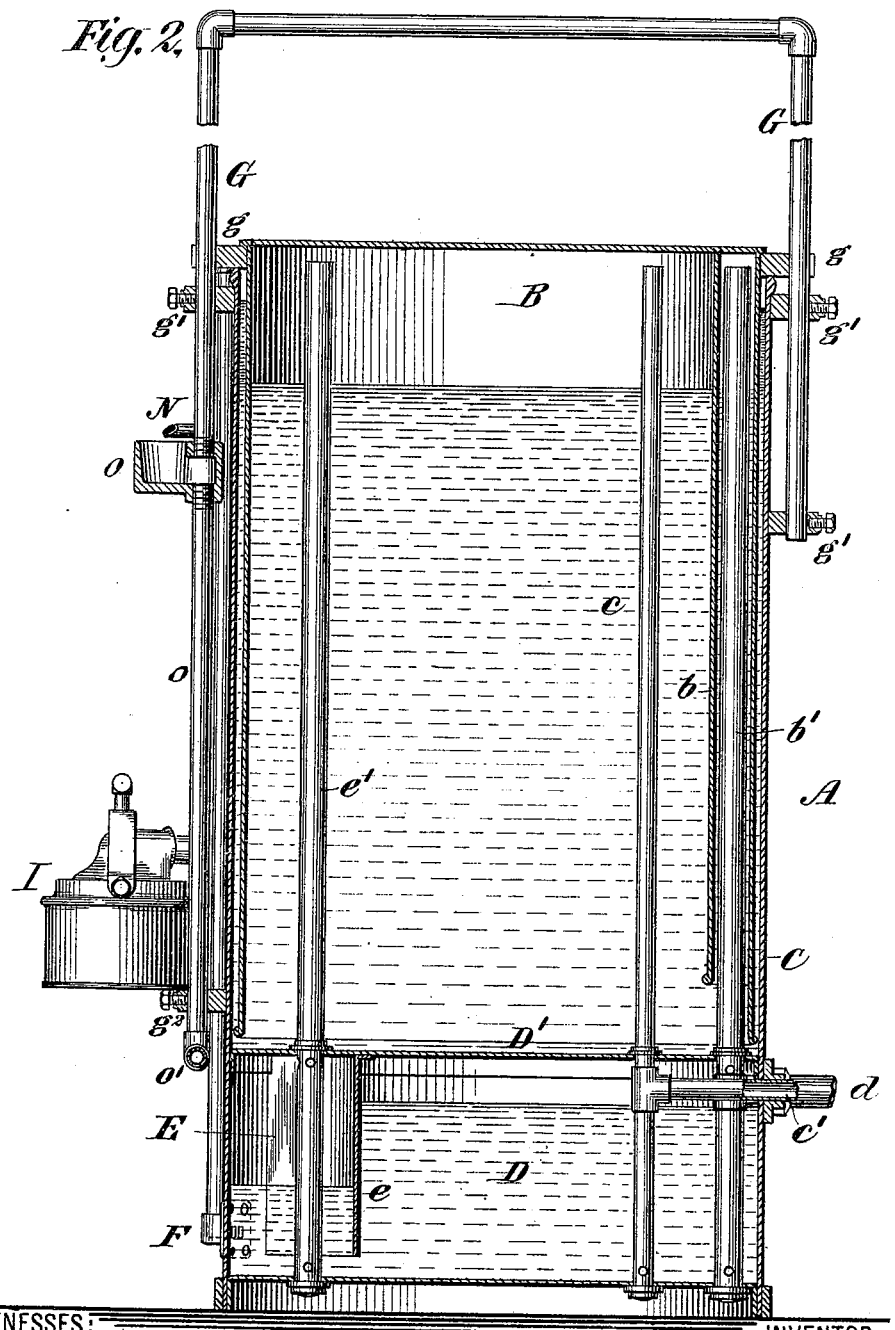

No. 643,643. Patented Feb. 20, 1900.
H. F. FULLER.
APPARATUS FOR GENERATING ACETYLENE GAS.
(Application filed Jan. 4, 1899.)
(No Model.) 3 Sheets—Sheet 3.
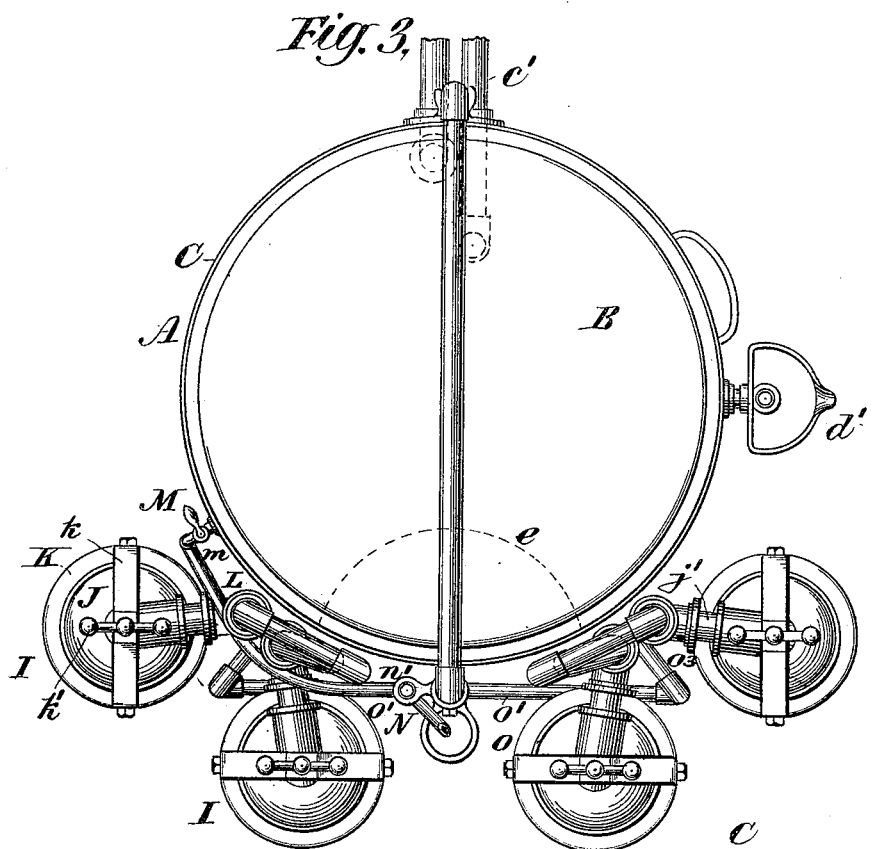
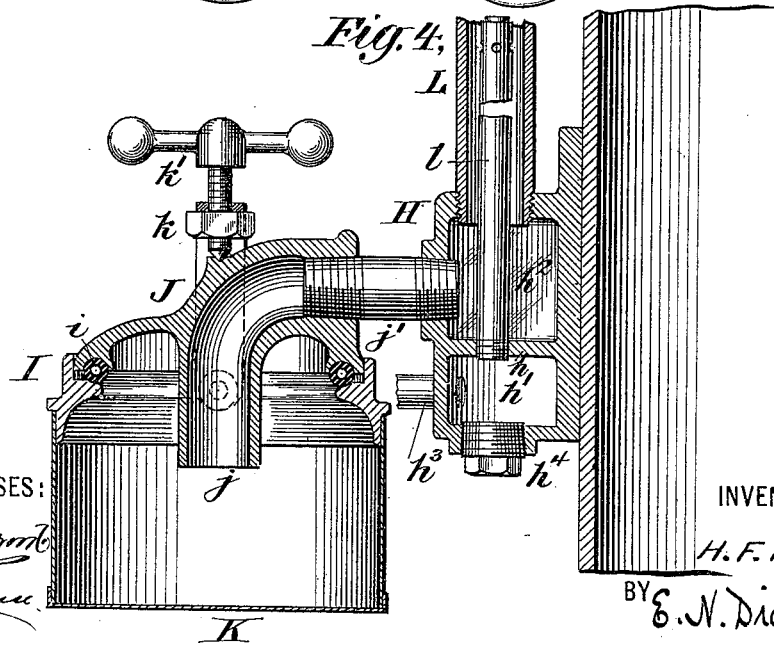
WITNESSES:
INVENTOR
H. F. Fuller
BY E. N. Dickerson
HIS ATTORNEY

UNITED STATES PATENT OFFICE.

HENRY F. FULLER, OF NEW YORK, N. Y., ASSIGNOR TO THE ACETYLENE APPARATUS MANUFACTURING COMPANY, OF WEST VIRGINIA.

APPARATUS FOR GENERATING ACETYLENE GAS.

SPECIFICATION forming part of Letters Patent No. 643,643, dated February 20, 1900.

Application filed January 4, 1899. Serial No. 701,120. (No model.)

*To all whom it may concern:*

Be it known that I, HENRY F. FULLER, a citizen of the United States, residing at New York, (Brooklyn,) county of Kings, and State of New York, have invented certain new and useful Improvements in Apparatus for Generating Gas, of which the following is a specification.

My invention relates to an apparatus for generating gas, and especially acetylene gas.

I will first describe an apparatus embodying my invention and then point out the novel features in the claims.

In the accompanying drawings, Figure 1 is an elevation of an apparatus embodying my invention. Fig. 2 is a sectional elevation looking in the direction of the arrow in Fig. 1. Fig. 3 is a plan of the apparatus. Fig. 4 is a detail sectional view, on an enlarged scale, of a carbid-receptacle with its support.

Similar letters of reference designate corresponding parts in all the figures of the drawings.

A represents a gasometer. This gasometer, besides storing the unconsumed gas, acts to regulate the supply of water to the generator, though another means might be substituted. There are two main portions to the gasometer.

The movable part B of the gasometer rises as the gas generated is in excess of that consumed. This part carries with it a tube $b$, which when it is raised above the surface of the water in the gasometer allows the gas to escape through another tube $b'$ into the open air, thus acting as a safety device or blow-off.

$c$ represents a tube or pipe for conducting the gas to an outlet $c'$, which is connected with the burners.

The stationary part C of the gasometer A is provided with a horizontal wall or diaphragm D' near its lower end to form a chamber D, which has a blow-off $d$ and an overflow $d'$ for the water contained in said chamber.

E represents a trap provided in the chamber D, into which the gas enters from a generator before it passes to the burners. This trap may be conveniently formed by means of a vertical wall $e$, that is secured to the horizontal wall or diaphragm D'. The water contained in the chamber D forms a seal between the trap E and the blow-off $d$. The gas from the generator enters the trap below the water-level therein through openings F in the wall of the stationary part of the gasometer and passing through the water in the trap enters the pipe $e'$, which leads from the trap to the space above the water in the gasometer.

G G are guides for the part B in its vertical movements within the stationary part C. Engaging with the guides G are arms $g$ $g$, that are attached to the part B.

$g'$ $g'$ are braces for the guides G G, fastened for convenience to the stationary part C of the gasometer.

In the generator employed in this invention instead of having the whole charge of carbid in a single chamber it is divided and placed into a number of separate chambers, which are successively exhausted. The following arrangement may be conveniently employed:

H represents a hollow support that is preferably secured to the wall of the stationary part of the gasometer. It is divided into upper and lower chambers by a wall $h$, the lower chamber $h'$ being connected with a water-supply, while the upper chamber $h^2$ is connected with receptacles containing the carbid. The upper chamber $h^2$ is divided into one or more compartments, one of which is connected with each receptacle.

I represents the receptacle for containing the charge of carbid. It comprises a cover J and a chamber portion K, that is detachably secured by any convenient means, such as the bail $k$ and screw $k'$, to the cover. A suitable packing $i$ is placed between the two parts. The cover J is provided with a vertical passage $j$, ending in the chamber K, and which is connected with the chamber $h^2$ of the support H by means of the nipple $j'$.

Connected with each of the chambers $h^2$ is a vertical pipe L, leading upward from the support H and connected by means of pipes $f$ with the openings F of the trap E. Within the tube L is a smaller tube $l$, which extends downward through the chamber $h^2$ and is connected with the lower chamber $h'$ by means of an opening through the wall $h$. The upper end of the tube $l$ is provided with openings for the passage of the water, and the length of the tube or the height of the openings varies according to the receptacle with which it is connected.

Water is admitted from a water-supply to the chamber $h'$ through the opening $h^3$ in its walls, connected to a supply-pipe $o^8$.

$h^4$ represents a plugged opening for cleaning out the chamber $h'$.

The supply of water to the carbid may conveniently be controlled in the following manner:

M represents a faucet or outlet for the water contained between the two parts of the gasometer. It is placed below the level of the water therein. Connected with this faucet by means of a flexible tube $m$ is a spout N, which for convenience may be secured to a lug $n'$ upon one of the guide-arms $g$ by means of a rod $n$, so as to follow in its vertical movement the portion B of the gasometer. The length of the rod $n$ is such that the spout N is brought below the water-level in the gasometer when the movable portion B descends to its lowest position.

O represents a funnel placed in this machine directly beneath the spout N. This funnel may for convenience be secured to one of the guides G. It has leading from it a pipe $o$, which, as shown, forms a continuation of the guide G and is held at its lower end by a brace $g^2$, fastened to the stationary portion C of the gasometer. Branch pipes $o'$, $o^2$, and $o^3$ connect this pipe $o$ with the chambers $h'$ of the supports H.

The water-level may be maintained in the gasometer by any suitable device in connection with an outside water-supply.

The following is the operation of the apparatus: The requisite amount of carbid having been placed in the receptacles and the water-supply started, the water combines with the carbid to form acetylene gas, which is conducted to the gasometer. Suppose the gas thus generated to be withdrawn from the gasometer by its consumption in the burners connected therewith. With the removal of gas the movable portion B of the gasometer descends. As this descent continues, the spout N, descending simultaneously, is brought to a level below that of the water between the parts of the gasometer. At this point the water will flow from the faucet M through the flexible tube $m$ and out from the spout N into the funnel O beneath it. The leading-pipes $o$, $o'$, $o^2$, and $o^3$ conduct the water to the chambers $h'$ of the hollow supports H. The height of the column of water in the pipe $o$ is sufficient to force the water along, and the chambers $h'$, if not already full, begin to fill up. When these are filled, the water next rises in all of the tubes $l$ connected with the chamber $h'$. These tubes $l$ are of varying heights, for convenience the shortest one being in connection with the first chamber, and so on successively until the last and tallest. Having this arrangement, the water will, as it rises in these tubes, overflow from the first one into the outer tube L, while the water in the remaining tubes comes to rest, waiting until the tube L becomes filled up before it can again rise. The water overflowing from the tube $l$ falls into the chamber $h^2$ of the support H, and thence by the nipple $j'$ and the passage $j$ into the chamber portion K of the carbid-receptacle I. The gas generated passes through the passage and the nipple in a direction opposite to that of the inflowing water. Two results are thus accomplished: First, the contact with the cold water entering serves to cool the gas and condense a portion of the water contained by it; secondly, the force of the gas rising in the passages tends to retard the inflow of the water, so that if the gas is generated very rapidly it will entirely stop the admission of water. The gas then passes out through the chamber $h^2$ and the tube L, and thence by the tubes $f$ to the holes F in the wall $C'$ of the gasometer. Entering the trap E, it then passes up through the water therein, which completes the cooling and the removal of moisture and also washes the gas of impurities. The gas then passes through the openings in the pipe $e'$ and by that pipe passes to the space above the water in the portion B of the gasometer.

When the first carbid-receptacle fails to generate gas sufficiently fast, the water runs into it faster than it combines with the carbid and in time fills up the chamber K of the receptacle to the level of the passage $j$. When this point is reached, the receptacle can take no more water on account of the air-cushion formed within the cover, and the water still rising fills up successively the passage $j$, the nipple $j'$, the chamber $h^2$, and the tube L up to the openings in the inner tube $l$. Thereafter the rise is resumed in the remaining inner tubes $l$, and the second thereof—the next higher—in turn overflows precisely as the first did and the water attacks the carbid in the second receptacle. Upon the exhaustion of the second the third in turn is substituted, and this operation continues to the end of the series. In this way one receptacle is exhausted and filled with water before another is attacked, and the removal of the receptacle for recharging is accomplished without escape of gas into the air. It is manifest that any number of receptacles may be employed in like manner and the life of one charging increased to any desirable degree. It will be seen that by this disposal of the carbid into a number of receptacles a small portion only of the total charge is attacked at one time and is exhausted before another portion is attacked, thus limiting the rate of generation of gas, while permitting a large amount of carbid to be placed into the machine at one time, lengthening thereby the time of operation. Another advantage is the increased facility for regulating the generation of gas, the least amount possible being generated when the water-supply is cut off.

The space within the gasometer above the water therein serves to receive and store the gas from the generator. A tube $c$, whose open end is in this space, carries off the gas to the outlet $c'$, whence it passes to the points of consumption.

If the burners should be turned off or for other reasons the gas should be generated more rapidly than it is consumed, the movable portion B of the gasometer rises by the pressure of the gas, thus making space for storing it and at the same time by raising the spout N above the level of the water cuts off the supply of water to the carbid, and thereby limits the generation of gas to that produceable by the small amount of water remaining in the receptacle. The gas so unconsumed remains in storage until further need.

The trap provided in this apparatus serves a double purpose. The chamber D, within which it is situated, contains water, which forms a seal between the trap and the blow-off $d$, and as the amount of this water is increased by the condensation from the gas it may escape by the overflow $d'$.

When the receptacle I is removed for recharging, the trap E prevents the gas by its pressure from returning through the openings F to the generator, and thus escaping. This results from the positions of the openings F, which are below the level of the water. What does happen is that the water enters the openings F and rises in the tubes $f$ to a height corresponding to that in the chamber D.

In case the movable portion B of the gasometer should fail to rise for any reason the pressure of the gas would increase and would not only depress the level of the water in the portion B, but would also depress that within the trap E. Upon the increase of this pressure beyond a certain point the level of the water in the trap would reach the bottom of the trap-wall $e$, and thereby permit the escape of the gas under the wall into the chamber D, whence it escapes through the blow-off to the outer air.

What I claim as my invention is—

1. In a machine for generating gas the combination with a gasometer, having a movable part and a stationary part, of a generator, comprising a number of carbid-receptacles, and supports for said receptacles, said supports having lower chambers in connection with a water-supply, upper chambers in connection with said receptacles and a connection between said upper and lower chambers, said water-supply, and means for controlling it.

2. In a machine for generating gas, the combination with a gasometer, having a movable and a stationary part, of a generator, comprising a number of carbid-receptacles, a hollow support therefor, said support having upper chambers in connection with said receptacles, and a lower chamber, a vertical pipe for each of said upper chambers, a pipe within said first-mentioned pipe and passing through said upper chamber into said lower chamber, the length of said inner pipe varying with each of said upper chambers, and a water-supply for said lower chamber.

3. In a gas-generating machine the combination of a gasometer, having a movable and a stationary part, a generator consisting of a number of carbid-receptacles, hollow supports therefor, said supports having upper chambers in connection with said receptacles, and lower chambers in connection with a water-supply, a suitable connection between said upper and lower chambers, whereby water from said lower chambers may attack the contents of but one of said receptacles at a time, a water-supply for said lower chambers, and means for controlling said water-supply actuated by the movements of said gasometer.

4. A generator for a gas-generating machine consisting of a plurality of carbid-receptacles, and a suitable support for said receptacles, said support provided with a plurality of chambers, of which chambers one is connected with a water-supply, means connecting said water-supply chamber with other chambers whereby the latter are supplied successively with water, and means connecting said receptacles with chambers, substantially as specified.

5. A generator for a gas-machine comprising a number of carbid-receptacles, a suitable support therefor, provided with a plurality of chambers, one of said chambers being in connection with a water-supply, and others thereof in connection with said carbid-receptacles, and connections between said water-supply chamber and the others thereof, adapted to supply said receptacles successively with water, said connections consisting of a number of pipes, having varying heights and outlets at the upper end thereof, all in communication with said water-supply chamber and each of said outlets in communication with one of said other chambers connected with said receptacles, substantially as specified.

6. In a gas-generating machine, the combination with a gasometer, comprising a movable part and a stationary part, of a generator comprising a plurality of carbid-receptacles and a suitable support for said receptacles, said support being provided with a plurality of chambers, some of said chambers being in communication with said receptacles, and others of said chambers being in communication with a water-supply, said water-supply adapted to be controlled by the said movable part of said gasometer, and communication between said former chambers and said latter chambers consisting of a number of pipes of different lengths, all of said pipes in communication with said water-supply chambers, and each of said pipes having an outlet at its upper end in communication with one of said former chambers in communication with a carbid-receptacle whereby said receptacles are supplied successively with water.

In testimony whereof I have signed my name to this specification in the presence of two subscribing witnesses.

HENRY F. FULLER.

Witnesses:
  GEO. E. CRUSE,
  W. LAIRD GOLDSBOROUGH.